(12) United States Patent
Kroemer et al.

(10) Patent No.: US 8,424,392 B2
(45) Date of Patent: Apr. 23, 2013

(54) HOUSING ARRANGEMENT FOR ULTRASOUND FLOW METER AND ULTRASOUND FLOW METER

(75) Inventors: Harald Kroemer, Ansbach (DE); Wilhelm Oefelein, Ansbach (DE)

(73) Assignee: Hydrometer GmbH, Ansbach (DE)

( * ) Notice: Subject to any disclaimer, the term of this patent is extended or adjusted under 35 U.S.C. 154(b) by 162 days.

(21) Appl. No.: 13/106,389

(22) Filed: May 12, 2011

(65) Prior Publication Data
US 2011/0277557 A1     Nov. 17, 2011

(30) Foreign Application Priority Data

May 12, 2010   (DE) .......................... 10 2010 020 338

(51) Int. Cl.
*G01F 1/20*     (2006.01)
(52) U.S. Cl.
USPC ....................................................... 73/861.18
(58) Field of Classification Search ............... 73/861.18, 73/861.19
See application file for complete search history.

(56) References Cited

U.S. PATENT DOCUMENTS

| | | | |
|---|---|---|---|
| 4,333,352 A | 6/1982 | Connery et al. | |
| 4,742,717 A | 5/1988 | Ichino | |
| 5,354,220 A * | 10/1994 | Ganguly et al. | 439/675 |
| 5,515,733 A * | 5/1996 | Lynnworth | 73/861.27 |
| 6,055,847 A * | 5/2000 | Hafele et al. | 73/31.05 |
| 6,453,757 B1 * | 9/2002 | Montag et al. | 73/861.28 |
| 2011/0079090 A1 | 4/2011 | Kroemer et al. | |

FOREIGN PATENT DOCUMENTS

| | | |
|---|---|---|
| DE | 31 36 797 A1 | 5/1982 |
| DE | 19549162 A1 | 8/1996 |
| DE | 29611678 U1 | 9/1997 |
| DE | 10 2005 001 895 A1 | 7/2006 |
| DE | 10 2007 011 547 A1 | 9/2008 |
| DE | 10 2008 027 687 A1 | 12/2009 |
| EP | 0260335 A1 | 3/1988 |
| EP | 0477418 A1 | 4/1992 |
| EP | 0532971 A1 | 3/1993 |
| EP | 0 708 313 A2 | 4/1996 |
| EP | 0890826 A1 | 1/1999 |
| EP | 2 037 231 A1 | 3/2009 |
| EP | 0 890 826 B1 | 11/2009 |
| EP | 2 236 994 A1 | 10/2010 |
| EP | 2306160 A1 | 4/2011 |
| GB | 2101318 A | 1/1983 |

* cited by examiner

*Primary Examiner* — Jewel V Thompson
(74) *Attorney, Agent, or Firm* — Scully, Scott, Murphy & Presser, P.C.

(57) ABSTRACT

The present invention relates to a housing arrangement for an ultrasound flow meter, comprising a unipartite or multipartite housing (2) provided to be connected to a fluid line, comprising an ultrasonic transducer having an ultrasonic transducer body and a housing or covering which at least partially surrounds the ultrasonic transducer body, comprising a housing opening provided in the housing (2) for positioning the ultrasonic transducer at the housing arrangement, comprising a sealing element arranged between the housing (2) and the ultrasonic transducer, wherein a housing insert (5) can be inserted in the housing opening (16) as a module, the housing insert (5) is adapted to receive at least two ultrasonic transducer bodies (4, 7) which are positioned separately, without the ultrasonic transducer body (4, 7) coming into contact with the fluid, and the housing insert (5) is connected to the housing (2) via a sealing element (13) which is common to the ultrasonic transducer bodies (4, 7) which are positioned in the housing insert (5). The present invention furthermore relates to an ultrasound flow meter with a corresponding housing arrangement.

23 Claims, 5 Drawing Sheets

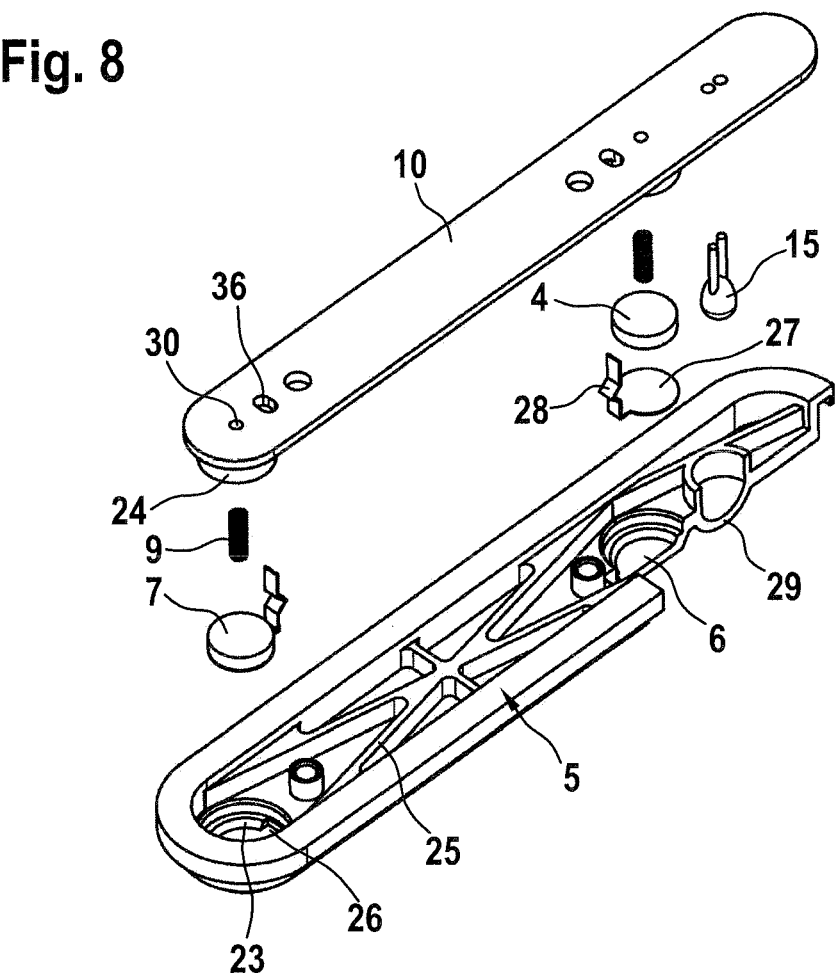

HOUSING ARRANGEMENT FOR ULTRASOUND FLOW METER AND ULTRASOUND FLOW METER

The present invention relates to a housing arrangement for ultrasound flow meters according to the preamble of claim 1. The present invention furthermore relates to an ultrasound flow meter having a corresponding housing arrangement.

TECHNOLOGICAL BACKGROUND

Sealing and contacting ultrasound flow meters is a technically demanding and complicated process. Housing openings must be sealed with filigree sealing elements made of the best sealing material. Due to the increased use of plastics materials, in which manufacturing tolerances can usually not be ruled out, it is easily possible under specific operating conditions for leaks to occur due to the small dimensions of the sealing elements. Leaks cannot be ruled out even if high-quality sealing materials are selected and time-consuming manual machining takes place.

PRIOR ART

EP 0 708 313 discloses a corresponding ultrasound flow meter, in which, in the housing thereof which usually consists of casting metal, ultrasonic transducers are placed into openings which are assigned to each individual ultrasonic transducer with the assistance of an associated union nut and of an O ring. A temperature sensor is also placed in an associated housing opening. This design necessitates a large number of individual parts. Moreover, it requires complex machining of the housing.

EP 2 037 231 A1 discloses a housing for an ultrasound flow meter, in which a unipartite, monolithic housing having planar contact locations arranged on the outside for the positioning of ultrasonic transducers is used. The ultrasonic transducers are attached on the outside of the housing with a specific spacing along said housing.

DE 10 2005 001 895 B4 discloses an apparatus for flow metering, in which the fluid flow is guided around a flow separation wall positioned perpendicular to the flow direction. An ultrasonic transducer arrangement is located in a housing cutout at the front end of the flow separation wall. The ultrasonic transducer arrangement comprises only a piezoelectric oscillator having a single earth electrode and two signal electrodes, which are arranged next to each other in a plane and are separate from each other, with each signal electrode being assigned an emission surface and a receiving surface for ultrasound signals.

EP 0 890 826 B1 discloses an ultrasound flow meter having a measuring insert made of plastic. The measuring insert is located in a recess in the housing of the flow meter and is sealed with respect thereto on the inlet side via a single seal. In addition, the measuring insert has a cover which is sealed with respect to the measuring insert via a circumferential seal. Located in the cover are two apertures, into which in each case one ultrasonic transducer, which comprises an ultrasonic transducer body and an associated housing, is placed, again with the insertion of a seal.

OBJECT

It is the object of the present invention to make available a novel housing arrangement of the generic type, which makes it possible for the production costs to be reduced.

SUBJECT MATTER OF THE INVENTION

The abovementioned object is achieved by way of the features of the characterizing part of claim 1. Expedient embodiments of the present invention result from the dependent claims and the description.

It is advantageously possible for only one common sealing element to be used for sealing due to the cup-shaped housing insert which holds at least two ultrasonic transducer bodies, which are positioned separate from each other, and is preferably closed on the bottom side. For this reason, only the housing insert with its sealing element must be matched to the housing opening. This leads to a drastic reduction in the number of necessary components and machining steps. Moreover, machining of the housing, which is usually made of casting metal, becomes much easier, which results in the accuracy of the installation position being subject to lower requirements. This in turn makes possible the use of a powder coating. Owing to the sealing of the housing insert with respect to the housing, a large-volume sealing element, in which production fluctuations of the sealing element or machining tolerances in the housing do not carry that much weight, can be used. Introducing a single elongate opening into the housing simplifies machining thereof. The inventive concept additionally allows for the housing insert to be used as a module, that is to say to provide a standardized housing insert suitable for a plurality of flow meter types, such as those with different nominal diameters. As a result, additional manufacturing costs can be considerably reduced.

Expediently, the respective ultrasound body is supported on a closed contact-surface inside the housing insert, with the result that ultrasound is transmitted through the closed wall of the housing insert. In the absence of sealing measures, this permits particularly simple mounting of the ultrasonic transducer body in the housing insert and lowers machining effort.

Expediently, the housing insert can additionally have centring means. These permit in particular very precise positioning of the measuring insert inside the housing relative to the housing insert carrying the ultrasonic transducer bodies. The ultrasonic transducer bodies must be positioned exactly with respect to the measuring insert.

Tolerance differences both in respect of the housing and of the housing insert can be easily compensated for because only one sealing body, in particular an O ring, which is circumferential along the circumference of the housing insert and is much more voluminous as compared to the sealing of an individual ultrasonic transducer body, is provided as the sealing element.

In one expedient embodiment, the housing insert has a curved surface which faces the inside of the housing and receives the contour of the measuring insert.

In an alternative embodiment, the inside of the housing insert is not matched to the outer contour of the measuring insert. In this case, the housing of the ultrasound flow meter itself has a curved housing internal wall in the region of the housing opening, with an aperture only in the respective ultrasonic through-transmission region. In this case, the housing insert is not matched to the geometry of the housing interior. It can therefore be used in ultrasound flow meters with different housing geometries in the manner of a module.

The invention is particularly suitable for use in a housing in the form of a single-piece pipe, in which the measuring insert, which comprises the measuring distance, deflection devices and possibly flow guiding devices, can be inserted into the housing from the front end. Due to the housing insert, the measuring insert can in this case be locked in position in a simple manner.

Expediently, a cover is provided on the upper side of the housing insert. In particular a printed circuit board can be used as the cover, which printed circuit board can be used to effect the electrical connection to the ultrasonic transducer bodies in a structurally simple manner.

Advantageously, contacting of the ultrasonic transducer bodies can be effected by means of contact springs, in which case for example one contact spring contacts one electrode and the other contact spring contacts the other electrode on the ultrasonic transducer body.

Potting compound is preferably located between the cover or the printed circuit board and the bottom of the housing insert, with the result that the remaining interior space of the housing insert is protected against the formation of condensation. As a result, the housing insert can also be used in cold water meters or cold meters without difficulty.

The housing insert additionally permits simple accommodation of a temperature sensor, because the housing itself no longer needs to have a hole for the temperature sensor.

The housing insert is preferably configured such that the temperature sensor inside the housing insert senses the temperature of the fluid, which flows through the ultrasonic flow meter, through the wall of the housing insert. As a result, the temperature sensor does not need to be sealed.

Advantageously, the temperature sensor can be fixed directly on the printed circuit board such that it cannot move.

The inside of the housing insert can, especially in the region of the positions of the ultrasonic transducer bodies, expediently be provided with an electrically conducting coating, which easily produces an earth contact.

Alternatively, the design according to the invention also offers the possibility of realizing the contacting of the ultrasonic transducer bodies via a two-dimensional electrode which is located between the respective ultrasonic transducer body and the housing insert.

The present invention moreover relates to an ultrasound flow meter having a housing arrangement according to at least one of Claims 1 to 18.

EXEMPLARY EMBODIMENTS OF THE INVENTION

Expedient embodiments of the present invention will be explained in further detail below with reference to drawing figures. Here, for reasons of clarity, repeating features are followed only once by a reference sign. Combinations of individual or partial features of the embodiments described below are regarded expressly as essential to the invention.

In the figures:

FIG. 8 shows an exploded view of the individual parts of the housing insert according to a further embodiment of the present invention.

FIGS. 1 to 7 described above are longitudinal sections. FIG. 8 is a partial longitudinal section.

Figure 1:
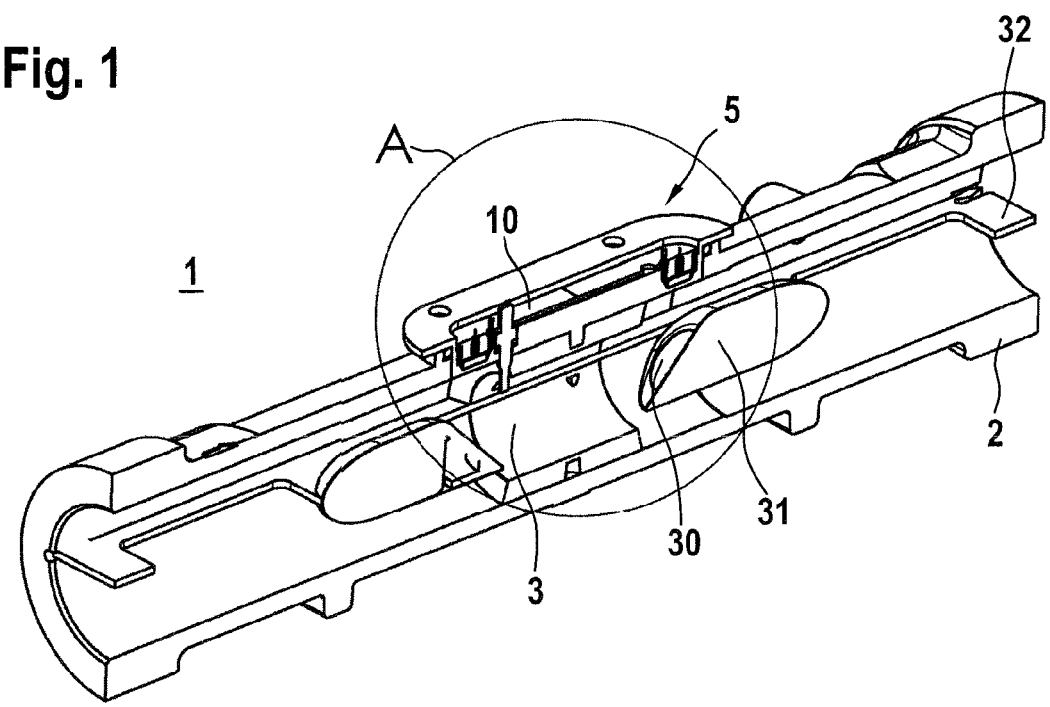
FIG. 1 shows a perspective view of a first embodiment of an ultrasound flow meter having a housing arrangement according to the present invention.

Reference sign 1 in FIG. 1 refers to an ultrasound flow meter, which is installed in a locationally fixed manner in a fluid line (not shown), such as a warm water line and/or cold water line, for detecting the rate of flow of the fluid. The ultrasound flow meter 1 has for this purpose an elongate tubular housing 2, which is usually made of casting metal. This housing is connected to the fluid line network via suitable connecting means (not shown) on the front ends of the housing.

The ultrasound flow meter 1 has a measuring insert 3 located inside the housing 2, which measuring insert 3 has an annular, cross-section-reducing measurement section (shown concretely in FIG. 1), which extends along the space located between the two deflection mirrors 30. The deflection mirrors 30 are supported by streamlined deflection mirror holders 31, which in turn are supported by a frame 32, which at the same time serves as a flow divider.

The measuring insert 3 is inserted at the front end into the housing 2 of the ultrasound flow meter 1 together with the previously identified components.

Located in the upper side of the housing 2 (cf. in this respect also FIG. 3) is an elongate housing opening 16, which is provided for receiving a housing insert 5. The housing insert 5 serves for positioning ultrasonic transducer bodies 4, 7 on the ultrasound flow meter 1. The ultrasonic transducer bodies 4, 7 are typically piezoelectric ceramic plates which transform electrical energy into acoustic energy and vice versa.

The housing insert furthermore comprises a temperature sensor 15, which extends through a hole 34 in the bottom region of the housing insert 5 into the interior of the housing 2 of the ultrasound flow meter 1 and is sealed with respect to the housing insert 5 by means of a sealing element 35.

Figure 3:
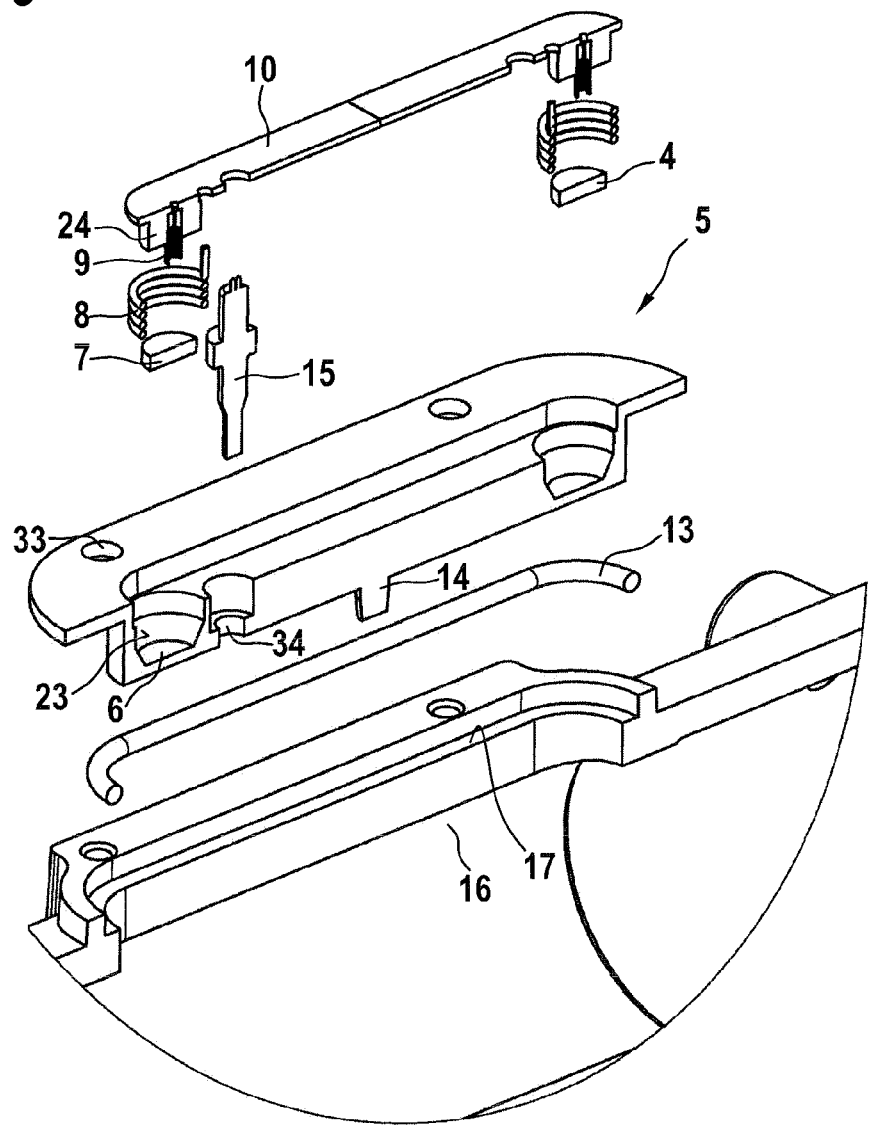
FIG. 3 shows an exploded view of the individual parts of the housing insert according to the embodiment according to FIG. 1 or FIG. 2 in the form of a perspective sectional view.

A single sealing element 13 in the form of a relatively large O ring which is circumferential in a shoulder 17, is provided for sealing the housing insert 5 with respect to the housing 2 (cf. FIG. 3).

The respective ultrasonic transducer body 4, 7, i.e. the respective piezoelectric ceramic plate, is located on the upper side of a supporting surface 6 on the inside wall of the cup-shaped housing insert 5. It is preferably matched to the diameter of the ultrasonic transducer body 4, 7. Contacting of the cover-side contact electrode (not shown in the drawing figures) is effected via a first, centrally arranged spring 9, which is guided in a holding part 24 and expediently serves for tapping the electrical signal or for electrical control. Contacting of the second contact electrode (likewise not shown in the figures) is effected via a second spiral-type spring 8 which produces earth contact. It is also possible to provide a metallic coating of the inside wall of the housing insert in place of the second contact electrode. For simplified mounting, a bevelled surface 23 is provided above the supporting surface 6, which bevelled surface 23 facilitates by way of centring the introduction and positioning of the respective ultrasonic transducer body 4, 7 on the supporting surface.

A cover in the form of a printed circuit board 10 with conductor tracks (not shown) is located on the upper side of the housing insert 5 and permits direct contacting of the spring 8 and of the spring 9.

Figure 2:
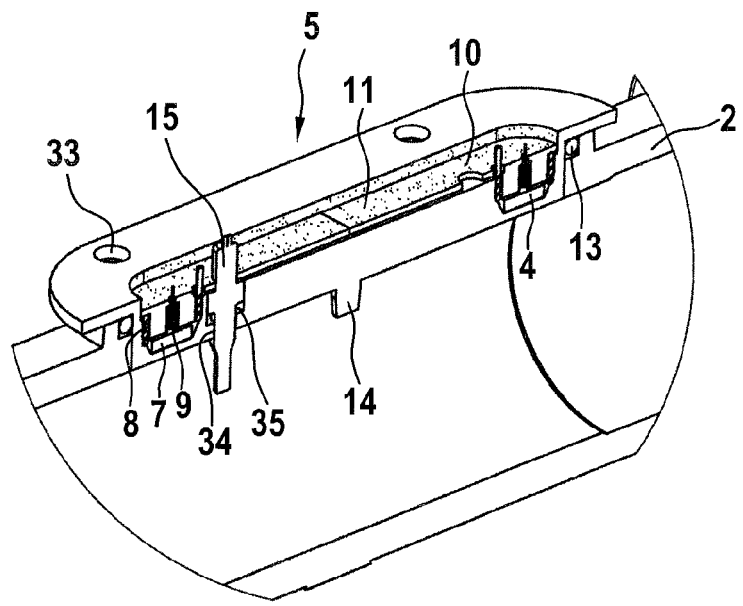
FIG. 2 shows an enlarged sectional view of the region A from FIG. 1.

As can be seen in FIG. 2, the remaining interior space of the housing insert 5 is filled with a potting compound 11, with the result that the ultrasonic transducer bodies 4, 7 and the springs 8, 9 are in contact with the potting compound 11 and formation of condensation is avoided.

It is also possible to provide for an upper end of the housing insert 5 a cover in the form of a plastics injection moulding part instead of the printed circuit board 10.

The housing insert 5 is screw-connected to the housing in a manner resistant to pressure and water by means of screws (not shown) and possibly holding parts (likewise not shown).

A pin 14 protruding on the bottom region serves for fixing the measuring insert 3 in the assembled state in its position via a corresponding cutout (not shown in the figures) in said measuring insert 3.

Figure 4:
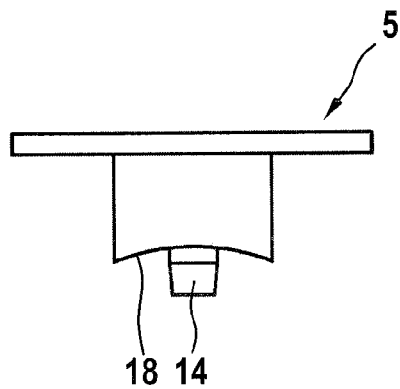
FIG. 4 shows a front view of the housing insert according to the embodiment according to FIGS. 1 to 3.

As can be seen from FIG. 4, the underside of the housing insert 5 is provided with an inwardly curved surface 18, which makes contact with the outside surface of the measuring insert 3 in the mounted state of the housing insert 5.

Figure 5:
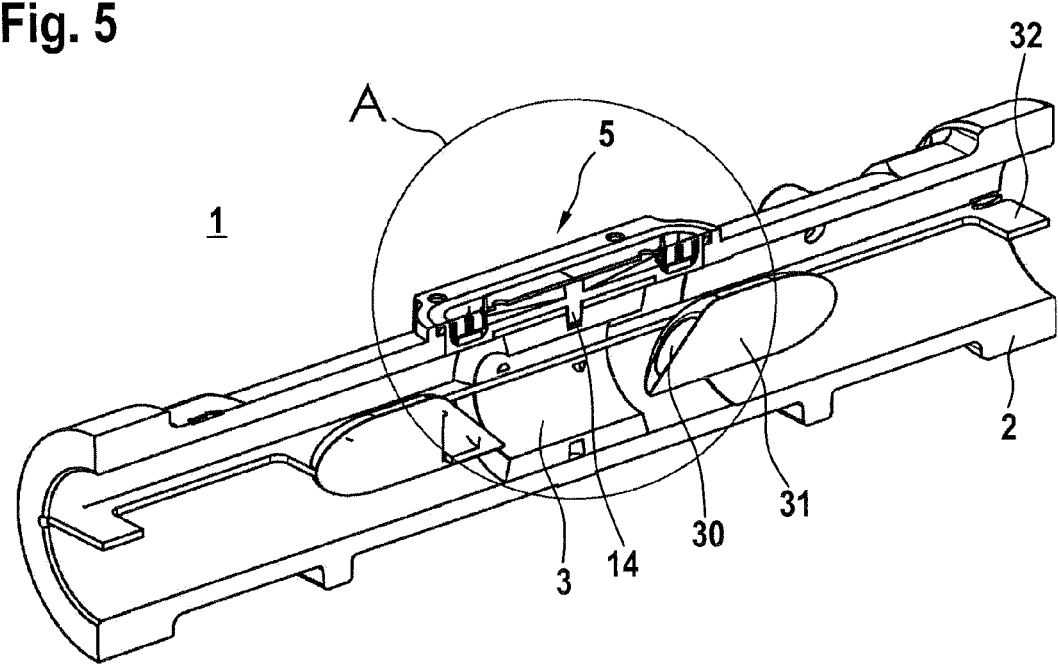
FIG. 5 shows a perspective view of a second embodiment of an ultrasound flow meter having a housing arrangement according to the present invention.
Figure 6:
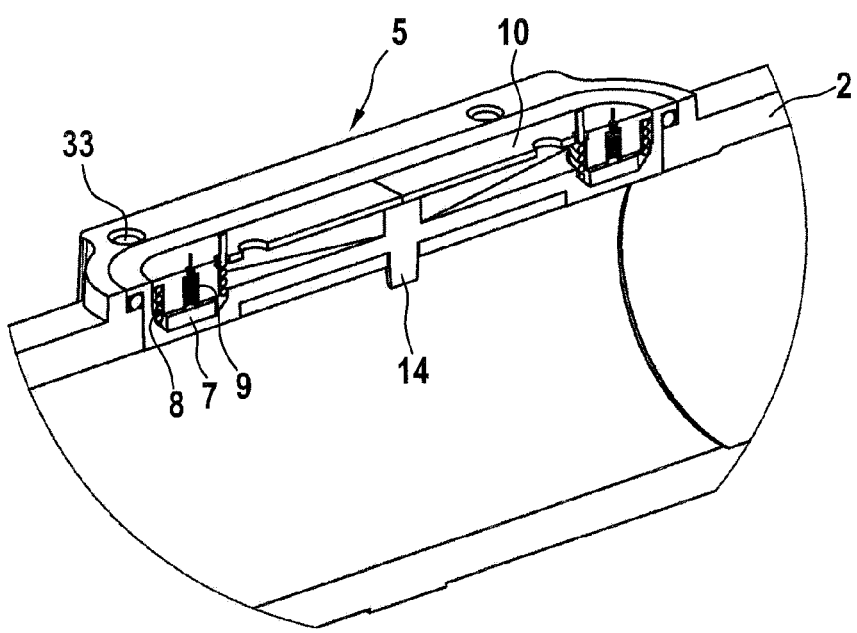
FIG. 6 shows an enlarged sectional view of the region A from FIG. 5.
Figure 7:
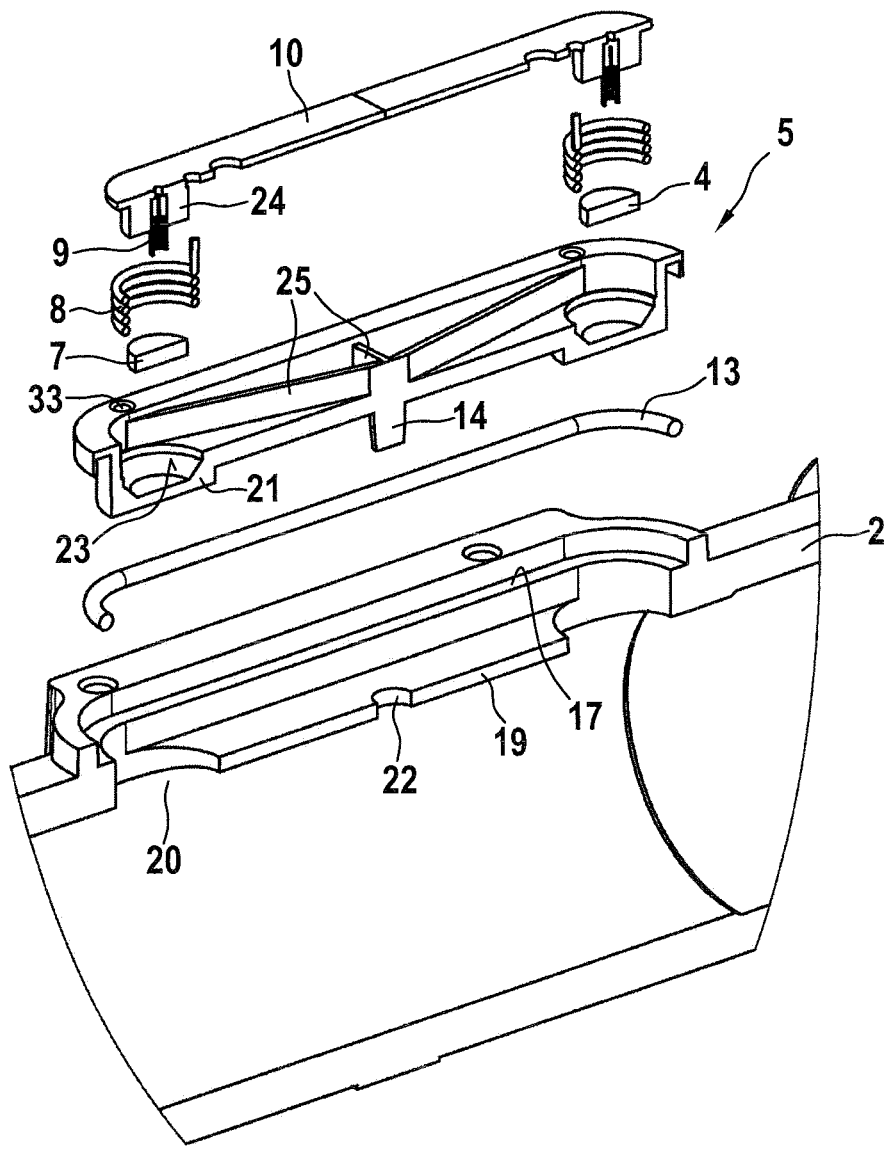
FIG. 7 shows an exploded view of the individual parts of the housing insert according to the embodiment according to FIG. 5 or FIG. 6 in the form of a perspective sectional view.

In the embodiment variant shown in FIGS. 5 to 7, the underside of the housing insert 5 is not matched to the contour of the measuring insert 3. The housing 2 has a housing internal wall 19, whose inner contour is matched to the outer contour of the measuring insert 3. The underside of the housing insert 5 can here be of planar design. The housing internal wall 19 is left as is when milling out the housing opening, specifically such that a minimum wall thickness, for example about 0.8 mm to 1.2 mm, on the central line is left.

The measuring insert 3 is in contact with the inside of the ultrasound flow meter 1 via corresponding domes 21, which engage in through-openings 20 in the housing internal wall 19. The domes 21 are preferably shaped such that they practically completely fill the openings in order to prevent air bubbles from settling. In this embodiment, the housing insert 5 can be used in the manner of a module for a wide variety of nominal diameters.

The contacting of the ultrasonic transducer bodies corresponds to that according to FIGS. 1 to 3.

In order to ensure sufficient pressure stability of the housing insert, it is expedient to produce it from a high-strength material (e.g. plastic) preferably reinforced with an additional material (e.g. glass fibres).

Moreover, it is expedient to carry out design measures for increasing the stiffness, such as stiffening ribs 25 of the exemplary embodiment according to FIGS. 5 to 7. Such reinforcing measures are important because the entire pressure of the fluid bears against the wall of the housing insert 5.

Alternatively or in addition, the housing insert 5 can be provided with a necessary material thickness.

In the region of the ultrasonic transducer bodies 4 and 7 or of the supporting surfaces 6, the housing insert 5 should have only a small wall thickness which enables sufficient sonic through-transmission.

The respective housing insert 5 can additionally be provided with a metallic coating in the region of the supporting surface 6 for electrically contacting the ultrasonic transducer bodies 4, 7.

The acoustic coupling of the respective piezoelectric ceramic plate to the wall of the housing insert 5 is expediently effected with a suitable sound conducting paste, for example made of silicone or PFPE. Alternatively, the ultrasonic transducer bodies 4, 7 can also be glued in or contacting can be effected by way of soldering to a contact layer of the housing insert 5. This results in particular in a rigid connection which is highly electrically conductive. The further electrical contacting on the upper side of the piezoelectric ceramic plate can be effected by way of the spring 9, which is connected preferably fixedly to the printed circuit board 10 or soldered thereto and presses the piezoelectric ceramic plate with a determined force against the membrane-type wall of the housing insert 5.

FIG. 8 shows a further embodiment variant, in which the temperature sensor 15, for example a so-called NTC element, detects the temperature of the fluid in the ultrasound flow meter 1 through the wall of the housing insert 5. To this end, for example a curved formation 29 is provided in the bottom of the housing insert 5, in which curved formation 29 the temperature sensor 15 is located. This temperature sensor can be thermally coupled to the wall of the housing insert 5 via a heat-conducting paste (not shown). In this way, there is no longer any need for a hole in the housing insert 5 or the sealing with respect to the inside. It is furthermore possible to use a non-encapsulated NTC element, which is much cheaper than the former.

Contacting of the ultrasonic transducer bodies 4 and 7 is effected in this embodiment not via a metal coating on the surface of the housing insert 5 but by means of an electrode 27, which is made of a thin metal foil. The electrode 27 is fixedly connected to the underside of the respective ultrasonic transducer body 4 and 7, for example adhesively bonded or soldered. In FIG. 8, right-hand side, the electrode is shown detached for the purposes of aiding better understanding of the entire form of the electrode. The material for the electrode 27 can be for example stainless steel (VA) or copper (Cu), which can be coated depending on further processing with a thin layer of precious metal (such as gold or silver). The connecting tab 28 moulded onto the electrode 27 is preferably soldered directly onto the printed circuit board 10. The connecting tab 28 has folds which are meant to prevent disadvantageous force transmission due to thermal expansion onto the electrode 27.

As an alternative to a fixed connection of the electrode to the respective ultrasonic transducer body 4, 7, it is possible due to the design according to the invention to provide in a simple manner a loose arrangement with the interposition of an acoustic coupling layer, for example a coupling gel, a coupling paste or the like. Here, the respective ultrasonic transducer body 4 and 7 and the electrode 27 can be held in position alone by the pressure force of the spring 9 and electrical contacting can be ensured.

The connecting tab 28 is bent over with a radial distance from the external diameter of the electrode 27 in order to avoid undesired electrical contacts with the lateral surface of the piezoelectric ceramic plate. For this reason, a curved formation or depression 26 is provided in the region of the surface 23. This curved formation or depression 26 at the same time ensures unique orientation of the electrode 27 including connecting tab 28 with respect to the corresponding solder hole 36 in the printed circuit board 10.

Contacting (signal contacting) is effected via the spring 9, which is either soldered directly to the printed circuit board 10 or contacts a conductor track thereon. In the latter case, a holding part 24 for positioning the spring 9 is provided.

LIST OF REFERENCE SIGNS 1 flow meter
2 housing
3 measuring insert
4 ultrasonic transducer body 5 housing insert
6 supporting surface
7 ultrasonic transducer body
8 spring
9 spring
10 printed circuit board
11 potting compound
12 module
13 sealing element
14 pin
15 temperature sensor
16 housing opening
17 shoulder
18 surface
19 housing internal wall
20 through-opening
21 dome
22 hole
23 surface
24 holding part
25 stiffening rib
26 depression
27 electrode
28 connecting tab
29 curved formation
30 deflection mirror
31 deflection mirror holder
32 frame
33 hole
34 hole
35 sealing element
36 solder hole

The invention claimed is:

1. A housing arrangement for an ultrasound flow meter, comprising:
a unipartite or multipartite housing provided to be connected to a fluid line,
an ultrasonic transducer having an ultrasonic transducer body and a housing or covering which at least partially surrounds the ultrasonic transducer body,
a housing opening provided in the housing for positioning the ultrasonic transducer at the housing arrangement,
a sealing element arranged between the housing and the ultrasonic transducer,
wherein
a housing insert can be inserted in the housing opening,
the housing insert is adapted to receive at least two ultrasonic transducer bodies which are preferably positioned separately and
the housing insert is connected to the housing via a sealing element which is common to the ultrasonic transducer bodies which are positioned in the housing insert.

2. The housing arrangement according to claim 1, wherein the housing insert is cup-shaped at least in the region of the ultrasonic transducer bodies.

3. The housing arrangement according to claim 1, wherein the housing insert has in each case one supporting surface on whose upper side the respective ultrasonic transducer body can be positioned.

4. The housing arrangement according to, claim 1, wherein the housing insert has centring means for a measuring insert to be inserted into the housing.

5. The housing arrangement according to claim 1, wherein a sealing body which is circumferential along the circumference of the housing insert is provided as sealing element.

6. The housing arrangement according to claim 1, wherein the underside oriented towards the inside of the housing is curved.

7. The housing arrangement according to claim 1, wherein the housing has a curved housing internal wall in the region of the housing opening, which housing internal wall has through-openings at the positions of the ultrasonic transducer bodies.

8. The housing arrangement according to claim 1, wherein the housing is configured as a single-piece pipe such that the measuring insert can be inserted from the front end of the housing.

9. The housing arrangement according to claim 1, wherein a common cover is provided on the upper side of the housing insert.

10. The housing arrangement according to claim 1, wherein contacting of the ultrasonic transducer bodies is effected by means of contact springs.

11. The housing arrangement according to claim 1, wherein the housing insert has a wall region in its bottom for a temperature sensor which is located, in the mounted state, on the inside of the wall region and detects the temperature through the wall of the housing insert.

12. The housing arrangement according to claim 11, wherein the temperature sensor is attached directly 25 to the printed circuit board.

13. The housing arrangement according to claim 1, wherein a potting compound is located between the cover and the bottom of the housing insert.

14. The housing arrangement according to claim 1, wherein the inside of the housing insert is coated.

15. The housing arrangement according to claim 1, wherein contacting of the ultrasonic transducer bodies is effected via a two-dimensional electrode which is located between the respective ultrasonic transducer body and the housing insert.

16. The housing arrangement according to claim 15, wherein the electrode has a connecting tab.

17. The housing arrangement according to claim 16, wherein the connecting tab has at least one fold.

18. The housing arrangement according to claim 15, wherein a curved formation or depression is provided in the region of the housing insert, which curved formation or depression receives, if the mounting position is correct, the foot region of the connecting tab and adjusts it in terms of location.

19. An ultrasound flow meter, comprising a housing arrangement according to claim 1.

20. The housing arrangement according to claim 9, wherein said common cover is a printed circuit board.

21. The housing arrangement according to claim 11, wherein the wall region in the bottom of the housing insert is a curved formation.

22. The housing arrangement according to claim 12 wherein the temperature sensor is soldered to the printed circuit board.

23. The housing arrangement according to claim 14, wherein the inside of the housing insert is regionally created with an electrically conductive layer.

* * * * *